H. BAMBERGER.
Machine for Cleaning and Polishing Coffee.
No. 207,383. Patented Aug. 27, 1878.
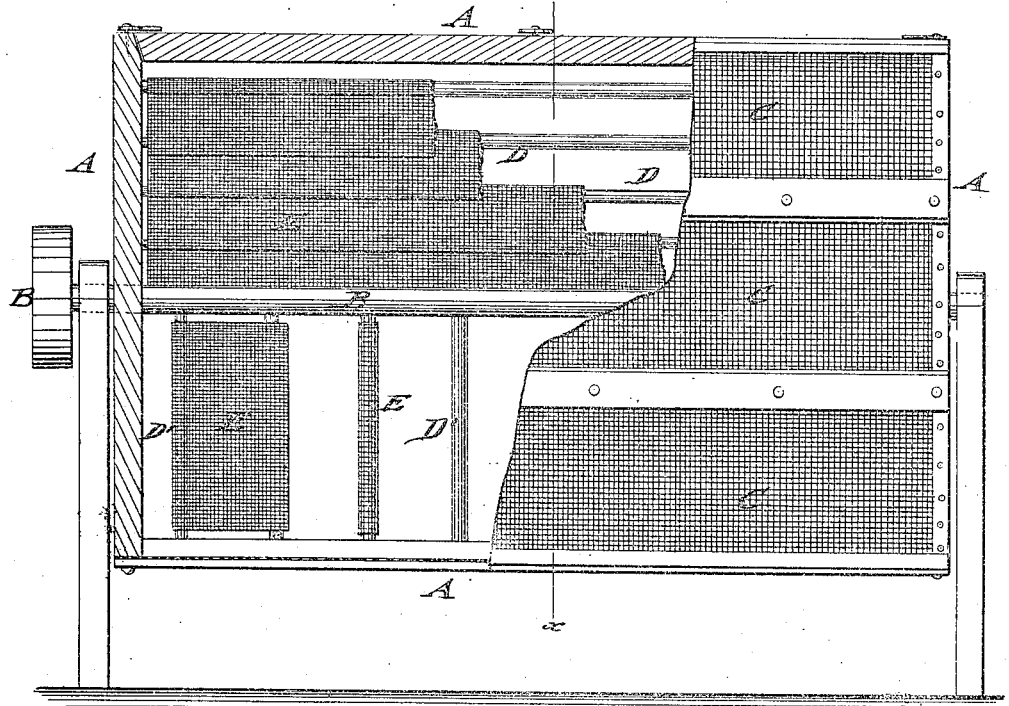
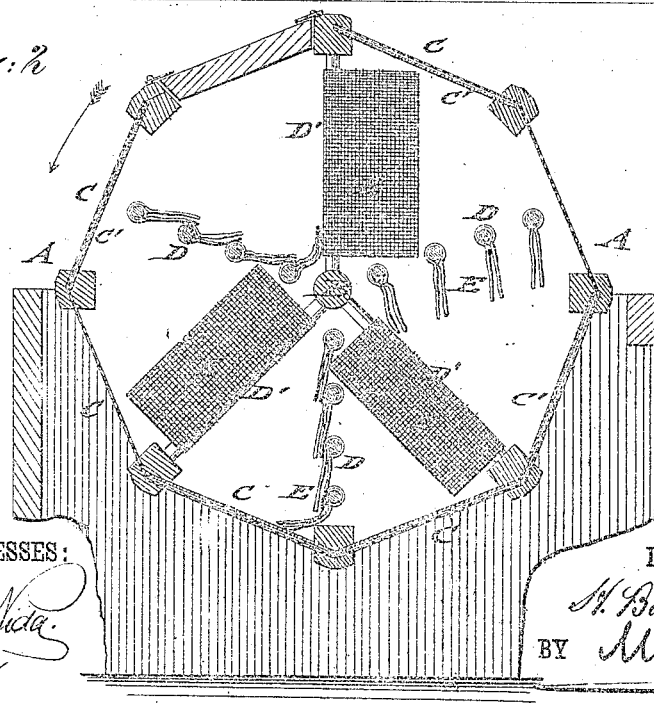
WITNESSES:
INVENTOR:
H. Bamberger
BY
ATTORNEYS.

UNITED STATES PATENT OFFICE.

HENRY BAMBERGER, OF PHILADELPHIA, PENNSYLVANIA.

IMPROVEMENT IN MACHINES FOR CLEANING AND POLISHING COFFEE.

Specification forming part of Letters Patent No. 207,383, dated August 27, 1878; application filed July 5, 1878.

*To all whom it may concern:*

Be it known that I, HENRY BAMBERGER, of the city and county of Philadelphia, and State of Pennsylvania, have invented a new and Improved Machine for Cleaning Coffee, of which the following is a specification:

In the accompanying drawings, Figure 1 represents a side elevation of my improved machine for cleaning coffee, partly in section to show interior construction; and Fig. 2 is a vertical transverse section of the same on line $x\,x$, Fig. 1.

Similar letters of reference indicate corresponding parts.

This invention has reference to an improved machine for cleaning coffee in superior manner of its adhering impurities, dry hulls, &c., and imparting to it a smooth and uniform appearance.

The invention will first be described in connection with the drawings, and then pointed out in the claim.

The drum is provided with fixed longitudinal and radial rods, of which some or all are arranged with canvas wipers, between which the coffee passes for being thoroughly cleaned by the friction therewith.

Referring to the drawings, A represents a revolving drum, of cylindrical, octagonal, or other shape, with solid heads, and a center shaft, B, that receives motion by suitable transmissions from a driving-shaft.

The drum A is constructed with sides or panels C, of which one or more are made of coarse wire-gauze, to admit the escape of the dust and impurities to the outside, while the remaining sides or panels are covered at their inner surface with coarse canvas or similar material C', that exerts a rubbing or frictional action on the surface of the coffee-beans. At the interior of the drum are arranged fixed longitudinal rods D, that are secured to the heads of the drum parallel to the center shaft, and alternating therewith a series of radial arms, D', that extend from the shaft to the longitudinal corner-stays of the drum. Some or all of the longitudinal and radial rods and arms may be provided with double canvas flaps or wipers E, that are secured around the rods and arms and made of suitable length.

By the revolutions of the drum the coffee is stirred continually by the rods and arms, and forced through between the wipers, that clean the beans from all adhering dirt, skins, &c., by their rubbing action in connection with the inner canvas and wire-gauze surface of the drum.

The coffee is charged to the drum through one or more removable doors in the sides of the same, and then revolved, stirred, and cleaned in rapid and reliable manner by the friction of the wipers, rods, and inner surface of the drum, so that the cleaning of the coffee is accomplished in quick and effective manner without any annoyance from dust.

I am aware that in grain-scourers the cylinders have been made of sheet metal with wire-gauze sections to allow for the escape of dust; but the effect on coffee is to rub in the dirt and polish over it, while my canvas sections wipe off the dirt and clean the berry. Hence,

What I claim is—

The combination of a revolving cylinder or drum, having panels of wire-gauze and canvas or similar frictional covering, with interior longitudinal rods and radial arms, of which some or all are provided with canvas or other flaps or wipers, substantially as and for the purpose specified.

This specification signed this 1st day of July, 1878.

HENRY BAMBERGER.

Witnesses:
 PAUL GOEPEL,
 C. SEDGWICK.